(12) United States Patent
Ramos et al.

(10) Patent No.: US 12,118,812 B2
(45) Date of Patent: Oct. 15, 2024

(54) USER-CREATED FINANCIAL INSTRUMENTS

(71) Applicant: International Business Machines Corporation, Armonk, NY (US)

(72) Inventors: Igor S. Ramos, Round Rock, TX (US); Marc Dickenson, Austin, TX (US); Andrew J Lavery, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 234 days.

(21) Appl. No.: 16/942,836

(22) Filed: Jul. 30, 2020

(65) Prior Publication Data
US 2022/0036060 A1    Feb. 3, 2022

(51) Int. Cl.
| | |
|---|---|
| *G06V 30/40* | (2022.01) |
| *G06F 16/27* | (2019.01) |
| *G06Q 10/10* | (2023.01) |
| *G06Q 30/018* | (2023.01) |
| *G06Q 40/02* | (2023.01) |
| *G06T 7/00* | (2017.01) |
| *G06V 10/44* | (2022.01) |

(52) U.S. Cl.
CPC ............. *G06V 30/40* (2022.01); *G06F 16/27* (2019.01); *G06Q 10/10* (2013.01); *G06Q 30/0185* (2013.01); *G06T 7/0002* (2013.01); *G06V 10/44* (2022.01); *G06Q 40/02* (2013.01); *G06T 2207/30176* (2013.01)

(58) Field of Classification Search
CPC ........ G06V 30/40; G06V 10/44; G06V 20/80; G06V 10/74; G06T 2207/30176; G06T 7/0002; G06Q 30/0185; G06Q 40/02; G06Q 20/042; G06Q 20/16; G06Q 30/0225; G06Q 20/06; G06Q 20/30; G06Q 20/02; G06Q 20/04; G06Q 20/108; G06Q 20/223; G06Q 2220/00; G06Q 10/10; H04L 2209/56; H04L 9/3236; G06F 16/27

See application file for complete search history.

(56) References Cited

U.S. PATENT DOCUMENTS

| | | | |
|---|---|---|---|
| 6,431,439 B1 | 8/2002 | Suer et al. | |
| 10,410,207 B1 * | 9/2019 | Butler | G06Q 20/356 |

(Continued)

FOREIGN PATENT DOCUMENTS

| | | |
|---|---|---|
| WO | 2010105327 A1 | 9/2010 |
| WO | 2018126031 A1 | 7/2018 |

OTHER PUBLICATIONS

Harman, "Is it legal to write an entire bank check by hand"; https://www.quora.com/Is-it-legal-to-write-an-entire-bank-check-by-hand#:~: text=It%20is%20legal%20to%20write,It%20is%20valid. (Year: 2014).*

(Continued)

*Primary Examiner* — Sumati Lefkowitz
*Assistant Examiner* — Michael Adam Shariff
(74) *Attorney, Agent, or Firm* — Peter J. Edwards

(57) ABSTRACT

An image of a financial instrument can be received and analyzed. One or more properties of the financial instrument can be determined based on the image. A uniqueness rating of the financial instrument can be determined based on the property or properties. Terms of the financial instrument are identified, and the financial instrument and identified terms are recorded in a digital storage base.

17 Claims, 9 Drawing Sheets

(56) References Cited

U.S. PATENT DOCUMENTS

| | | | |
|---|---|---|---|
| 10,832,050 B2* | 11/2020 | Fowles | G06Q 20/4016 |
| 11,216,802 B2* | 1/2022 | Overholser | G06Q 20/3678 |
| 2003/0125054 A1 | 7/2003 | Garcia | |
| 2009/0076951 A1 | 3/2009 | Szamel | |
| 2011/0161232 A1 | 6/2011 | Brown | |
| 2011/0211746 A1* | 9/2011 | Tran | G06K 9/00 |
| 2019/0295083 A1 | 9/2019 | Kud | |
| 2021/0035280 A1* | 2/2021 | Dewitt | G06F 16/583 |

OTHER PUBLICATIONS

"Is it true that you can hand-write a check on a piece of paper and it'd be valid, as long as the account/routing numbers are there?," Quora, Printed Dec. 13, 2019, 3 pages https://www.quora.com/ls-it-true-that-you-can-hand-write-a-check-on-a-piece-of-paper-and-itd-be-valid-as-long-as-the-account-routing-numbers-are-there.

Chum et al., "Near Duplicate Image Detection: min-Hash and tf-idf Weighting," Printed Dec. 13, 2019, 10 pages, http://www.robots.ox.ac.uk/~vgg/publications/papers/chum08a.pdf.

Simakov et al., "Summarizing Visual Data Using Bidirectional Similarity," IEEE Conference on Computer Vision and Pattern Recognition 2008 (CVPR'08), Anchorage, Alaska, 8 pages http://www.wisdom.weizmann.ac.il/~vision/VisualSummary.html.

Mell et al., "The NIST Definition of Cloud Computing," Recommendations of the National Institute of Standards and Technology, U.S. Department of Commerce, Special Publication 800-145, Sep. 2011, 7 pages.

\* cited by examiner

USER-CREATED FINANCIAL INSTRUMENTS

BACKGROUND

The present disclosure relates to software, and more specifically, to assisting in creating and detecting hand-drawn financial instruments.

Financial instruments, such as checks, gift cards, etc., are typically validated or otherwise registered by a registration authority, such as a bank or retailer. For example, customers are typically not permitted to create their own checks or gift cards, as doing so may give rise to various security concerns.

Blockchains may serve as a decentralized transaction ledger. Storing transactions in a blockchain enables verifying transactions between two parties who may not necessarily trust each other without the need for a third party (such as a bank) to verify the transaction. Further, blockchains enable the use of "smart contracts," essentially contracts that are executed automatically upon completion of pre-outlined criteria.

SUMMARY

Some embodiments of the present disclosure can be illustrated as a method. The method may comprise receiving an image of a financial instrument. The method may further comprise determining properties of the financial instrument based on the image. The method may further comprise determining a uniqueness rating of the financial instrument based on the properties. The method may further comprise identifying terms of the financial instrument, as well as recording the financial instrument and terms in a digital storage base.

Some embodiments of the present disclosure can also be illustrated as a computer program product comprising a computer readable storage medium having program instructions embodied therewith, the program instructions executable by a computer to cause the computer to perform the method discussed above.

Some embodiments of the present disclosure can be illustrated as a system. The system may comprise memory and a CPU. The CPU may receive an image of a financial instrument. The CPU may further determine properties of the financial instrument based on the image. The CPU may further determine a uniqueness rating of the financial instrument based on the properties. The CPU may further identify terms of the financial instrument, as well as recording the financial instrument and terms in a digital storage base.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure. Features and advantages of various embodiments of the claimed subject matter will become apparent as the following Detailed Description proceeds, and upon reference to the drawings, in which like numerals indicate like parts, and in which:

Figure 1:
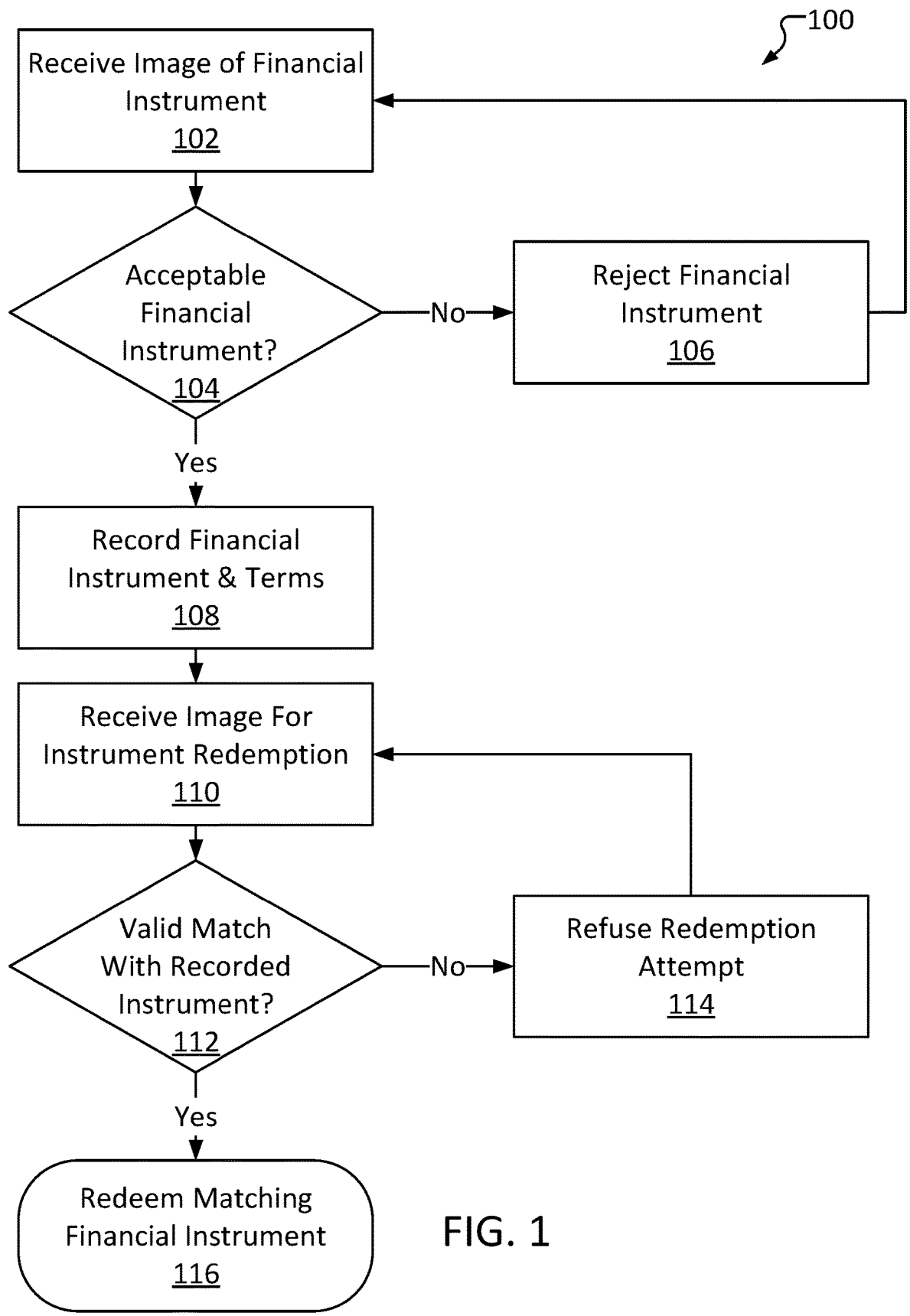
FIG. 1 illustrates an electronic financial instrument validation method according to several embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to a system and method to validate, register and redeem a user-created financial instrument. More particular aspects relate to a system to analyze an image of a user-created instrument, determine whether the instrument is sufficiently unique to function as a financial instrument, and prompt the user to add additional entropy to the instrument if necessary.

Throughout this disclosure, reference is made to "financial instruments" (or "instruments" for brevity) and "terms." As used herein, a "financial instrument" refers to a medium through which a financial right, benefit, or ownership may be transferred. For example, an electronic gift card, a check, and a money order may all be used as financial instruments. "Terms," as used herein, refers to parameters/information of a financial instrument used to outline obligations that the instrument represents such as, for example, identity of a payor, identity of an eligible payee, a transaction amount, restrictions or conditions governing redemption of the instrument, etc. Different financial instruments may have different terms. In some embodiments, financial instruments may omit some terms, resulting in a fallback "default" setting (for example, a financial instrument without a "payee identity" term may be redeemed by anyone), as well be described in further detail below.

A "payor," as used herein, refers to a user or party to a financial transaction (such as a transaction conducted via a financial instrument) that is sending funds to another party or is committing to send funds upon redemption of a financial instrument. In other words, "payor" and "offeror" are considered interchangeable for purposes of this disclosure.

A receiving party is referred to herein as a "payee," "recipient," or "offeree." Note that the term "payee" also refers to a user attempting to redeem a financial instrument; even if the user is not eligible to redeem the instrument, the user is still referred to herein as a "payee."

Throughout this disclosure, reference is made to a "registration authority." As used herein, a registration authority (or simply "authority") is an entity that manages a system of financial instruments. For example, the registration authority may store a database of images of financial instruments and terms associated with them. The registration authority may also determine validity of an attempt to redeem a financial instrument (in view of, for example, a comparison between a submitted image and a database, as well as terms of the instrument). The authority may also control funds associated with financial instruments, either directly (for example, the authority may be a bank) or indirectly (for example, the authority may be in communication with a bank and capable of causing the bank to transfer funds). In various embodiments, the authority may be a bank, a retailer, or a "middleman" entity.

Financial instruments are typically created and/or issued by a registration authority such as a retailer or bank. Financial instruments may include a variety of security features to both prevent forgery and to enable verification upon redemption. For example, a gift card may include a lengthy number (e.g., sixteen numbers or alphanumeric characters) such that only a user with the number (and, presumably, the card) is able to redeem the funds associated with the card.

Systems and methods consistent with the present disclosure enable a payor to create a financial instrument himself or herself. For example, a payor may draw an image "freehand" on a slip of paper (for example, the payor may write "Happy Birthday John! $25.00 from Eric" and draw a birthday cake). With the systems and methods of the present disclosure, this slip of paper with a handwritten note and drawing may function as a valid financial instrument akin to a personal check for $25.00. The payor may take a photograph of the instrument (using, for example, a camera of the payor's mobile device). The photographed image is then analyzed for uniqueness using one or more image recognition techniques such as, for example, near duplicate image detection.

Depending upon the results of the analysis, the payor may be prompted to modify the instrument (such as, for example, instructing the user to add additional entropy). "Entropy," as used herein, refers to one or more visible feature(s) of a financial instrument (such as, for example, marks, shapes, lines, etc.). Entropy can be "added" by modifying the financial instrument to make it more recognizably unique, such as by drawing on it, cutting it into a different (e.g., an irregular, non-rectangular) shape, coloring all or part of it, etc. A financial instrument may not be recognizably unique without sufficient entropy, so a user may be prompted to add entropy until an instrument is unique. For example, a prompt may include an instruction such as "draw additional curves on the instrument." In some embodiments, simply scribbling randomly on the financial instrument may constitute "adding entropy," as scribbles are often unique and thus may serve to make the financial instrument stand out from other documents, images, instruments, etc. The additional entropy may be necessary to make the instrument unique and recognizable. Once the instrument is deemed sufficiently unique, it may be registered as a valid financial instrument with one or more registration authorities (such as, for example, a bank, a retailer, etc.)

Once the instrument is registered, a recipient (e.g., John) may redeem the instrument by taking a photograph with, for example, the recipient's personal mobile device. The recipient's personal device may then submit the image of the instrument to an external system (such as a server), and the system may compare the image with a database or ledger of financial instruments to confirm that the submitted image is of a valid financial instrument. This system may be the registration authority (the entity that the payor registered the instrument with when first creating the instrument). In some embodiments, the recipient's personal device may perform (or authenticate) the comparison. If the system determines that the received image is of a valid financial instrument, the system may allow the recipient to redeem the instrument, such as by causing funds to be transferred as specified by the terms of the instrument.

It is possible for a unique, validated and registered instrument to fail this redemption check. For example, even with sufficient entropy, the instrument could become damaged (e.g., crumpled, faded, marred, torn) to the point at which the unique aspects of the instrument are no longer recognizable. In such a situation, the financial instrument may become unusable. However, in some embodiments, the user who issued the instrument may be able to issue a new instrument to replace the damaged instrument, such that the associated funds are not simply lost. In some embodiments, the user may cancel the damaged instrument to ensure that it can no longer be redeemed. In some embodiments, the act of issuing a replacement instrument may automatically result in a replaced instrument being voided and/or cancelled.

FIG. 1 illustrates an electronic financial instrument creation and redemption method 100 according to several embodiments of the present disclosure. Method 100 may be performed by, for example, a computing system such as system 500 of FIG. 5. Method 100 includes receiving an image of a financial instrument at operation 102. The financial instrument may have been created by a user, such as a payor. While the instrument may be hand drawn, it may also be designed through the use of a computer system. In some embodiments, receiving an image may include scanning the image. "Scanning" may include taking a photograph (as with, for example, a mobile device's built-in camera), capturing an image of the instrument in a scanner, etc.

Once an image is received, method 100 further includes determining whether the image includes an acceptable financial instrument at operation 104. Operation 104 may include, for example, performing one or more image processing or analysis methods on the image of the instrument to discern a level of uniqueness. For example, operation 104 may include determining a number, location, and/or orientation of various properties of the instrument in the image. Properties may include curved lines, straight edges, recognizable shapes and/or corners in the image, etc. This information may be combined to determine a uniqueness rating or value (or a series of uniqueness ratings for a plurality of properties), which may then be compared to a uniqueness threshold to determine if the instrument is acceptable. For example, the instrument may include several corners and straight edges resulting in relatively unique ratings for those properties, but very few curves, resulting in a relatively low rating for the "curve" property. In some embodiments, the results may be combined (for example, averaged) into an overall uniqueness rating or uniqueness value which is compared to a threshold in order to determine whether the instrument is "unique enough," while in some embodiments, each property must meet a defined threshold.

In some embodiments, operation 104 may also include a quality check to verify that the quality of the image of the financial instrument is acceptable. For example, the quality check may determine that the image was taken with poor lighting, or the image does not appear to contain sufficient focus or detail (e.g., if the camera was moved during the capture resulting in a blurred image, if the camera was too far away, if the camera was not focused on the financial instrument when capturing the image, etc.). If the quality check determines that the image quality is unacceptable, the system may be unable to determine whether the financial instrument itself is acceptable and may therefore reject the image (104 "No"). The payor may be prompted to capture a new image at operation 106 (optionally pointing out the specific quality issues) and operations 102-104 may be repeated.

If the financial instrument is not unique enough (104 "No"), method 100 further includes rejecting the instrument at operation 106. Operation 106 may include, for example, prompting the payor to add entropy to the instrument, such as by notifying a payor (via causing a display of a device to depict text, causing a speaker to emit sound, etc.) that the instrument is not sufficiently unique to be registered as a financial instrument. In some embodiments, operation 106 may include providing suggestions to the payor relating to a "type" of entropy to add. For example, if the instrument has relatively few curved lines, operation 106 may include suggesting drawing one or more curves on the instrument in order to make it more unique. Suggestions may be based on properties of the instrument determined from the analysis of the image performed at operation 104 or may be selected from a predetermined list (e.g., selecting suggestions in a preset preferential order, selecting them at random, etc.). The payor may then proceed to take another image of the "revised" instrument and submit it to the system performing method 100. The system would then receive the image of the "revised" instrument in operation 102. Thus, the uniqueness determination may repeat until the user either creates a sufficiently unique financial instrument or abandons the attempt altogether.

If the instrument is unique enough (104 "Yes"), method 100 includes recording the financial instrument and its terms at operation 108. As described above, "terms" is used herein to refer to parameters of the financial instrument such as identity of an offeror/payor, identity of intended recipient(s), amount, location/destination of funds (retailer, bank account, etc.). Additional possible instrument terms include a possible expiration, conditions under which redemption is to be honored, etc. Operation 108 may include determining the terms from the image of the financial instrument itself. For example, in some instances some or all of the terms may be written on the financial instrument (e.g., a slip of paper that is identified as the financial instrument may have an expiration date written on it). In some embodiments, terms may be manually specified by the payor. For example, a payor may be required to type the terms in one or more fields in a mobile application through which the payor uploads the image of the financial instrument.

In some embodiments, terms may include multiple potential recipients. In some such embodiments, any of those multiple potential recipients may be preemptively approved to redeem the financial instrument, whereas other users may need to be approved at the time of redemption. For example, when a user who is not preemptively approved attempts to redeem the instrument, a prompt may be sent to the payor. The prompt may include identifying information about the user attempting to redeem and may give the payor the ability to allow or deny the redemption. In some such embodiments, any user not included on the potential recipients list may be barred from redeeming the instrument. In some embodiments, the instrument may be redeemed by anyone (possibly on a first-come-first-serve basis or subject to other limitations such as location when attempting to redeem, time of day, etc.).

Operation 108 may "record" the financial instrument and its terms in, for example, a database, a blockchain ledger, etc. The instrument may be recorded by way of saving the image of the instrument or, to reduce storage overhead, by performing one or more image processing methods on the image and storing results of the processing. The database or blockchain may include multiple financial instruments (e.g., their terms as well as images of the instruments or data representing image processing results of the images). In some embodiments, the financial instrument may not be redeemed at least until the instrument and its terms are recorded. Depending upon terms of the instrument, the instrument may be considered "active" or "valid" once the recording is complete, or only once certain conditions are satisfied (such as timing, etc.).

In some embodiments, operation 108 may include confirming that the necessary funds are available. In some embodiments, operation 108 may include withdrawing the funds from a bank account. The funds may be withdrawn and held in escrow or otherwise "committed," and in some embodiments operation 108 may further include transferring the funds to a different party (such as a retailer or bank account).

For example, operation 108 may include purchasing a gift code from a retailer using a payment form (as identified by the financial-instrument terms) and storing the gift code. Thus, when a payee redeems the instrument, system performing method 100 may either provide the code to the payee or automatically utilize the code in the payee's transaction, depending upon embodiment and/or the terms of the instrument. In some embodiments, operation 108 may include transferring data to a bank to inform the bank that funds have been allocated to an instrument. In some embodiments, operation 108 may include purchasing a gift card from a retailer, receiving a code representing the gift card, and storing the code.

Method 100 further includes receiving a "redemption image" from a user attempting to redeem a financial instrument at operation 110. As used herein, "redemption image" refers to an image submitted to a system (such as the system performing method 100) as part of an attempt to redeem a financial instrument. As described above, even if a user submitting the redemption image is ineligible to redeem the financial instrument, that user may still be referred to herein as a "payee." Operation 110 may include, for example, receiving an image of a financial instrument (a "redemption image") from a payee. The redemption image may have been captured by the payee (such as after receiving the instrument from the payor).

Method 100 further includes determining whether an instrument in the redemption image is a valid match for a recorded financial instrument at operation 112. Operation 112 may include, for example, comparing properties of the instrument in the redemption image to properties stored in the database or blockchain of recorded financial instruments, directly comparing images, etc., as will be described in further detail below with reference to method 500 of FIG. 5. In some embodiments, even if the redemption image is determined to include a recorded financial instrument (a "match"), the match may not be "valid" if the terms of that recorded financial instrument indicate that it may not be redeemed for some reason (such as, for example, identity of the user submitting the redemption image does not match an eligible payee defined in the terms of the instrument, the instrument has expired, has already been redeemed, etc.). An "invalid match" may be treated as if no match was found (112 "No").

If no valid match was found (112 "No"), method 100 further includes refusing the redemption attempt at operation 114. Operation 114 may include, for example, sending an error message to an ineligible payee's device. The error message may indicate a nature of or reason for the refusal, such as a failure to find a match within a particular margin of error, terms of a matching instrument forbidding redemption at the time of submission of the redemption image, etc. In some embodiments, the error message may not indicate why the redemption was refused, so as to limit information that may be used by potential malicious actors. For example, a malicious user may attempt to submit images of a randomized financial instrument hoping to find a match; an error message indicating that a match was found but the terms indicate that the matching instrument cannot be redeemed for another hour may further enable such a malicious user to redeem a financial instrument he or she should not be entitled to.

If a match is found (112 "Yes"), method 100 further includes redeeming the matching financial instrument at operation 116. Operation 116 may include, for example, causing funds to be transferred from a first account to a second account as outlined by terms of the matching instrument. In some embodiments, operation 116 may include providing a payee with terms of the instrument and prompting the payee to accept, only redeeming the instrument if the payee accepts. In some embodiments, the payor may be notified when the redemption occurs. In some embodiments, the matching instrument may only be redeemed once the payor approves the redemption (for example, operation 116 may include notifying the payor of the redemption attempt and prompting the payor to confirm/reject the redemption). In some embodiments, the terms of the matching financial instrument may control whether or not notifications are sent or approvals are required before redemption.

Figure 2B:
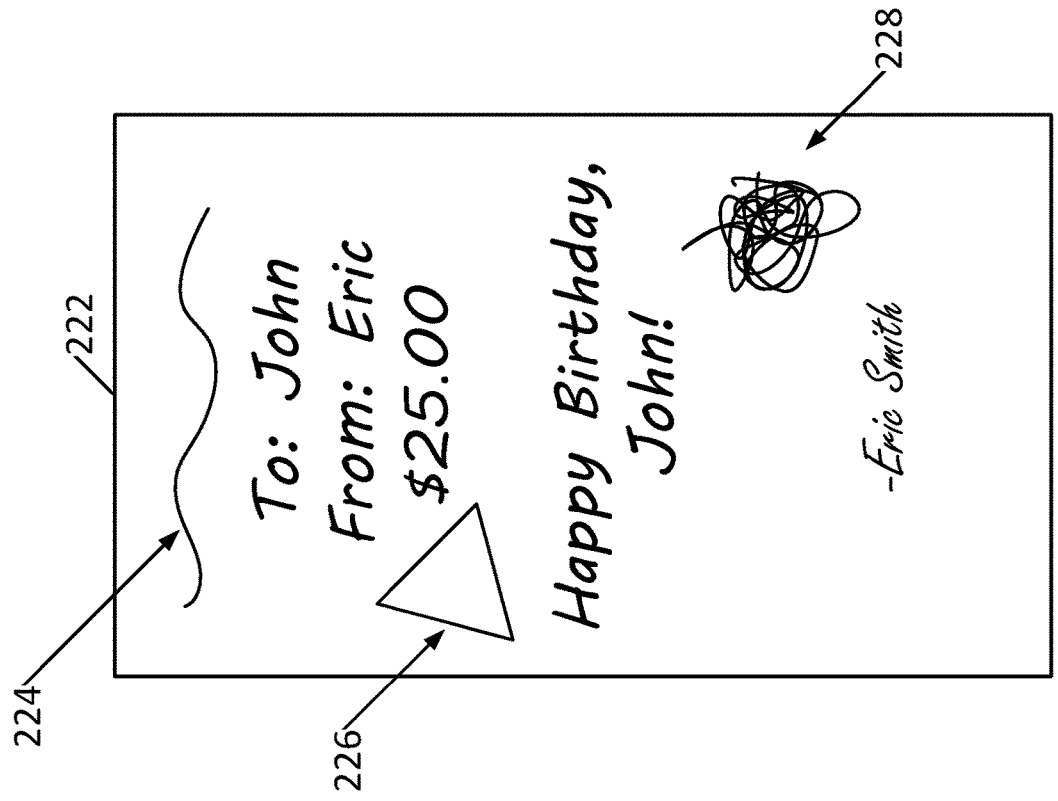
FIG. 2B illustrates an example revised financial instrument comprising the example instrument of FIG. 2A with added entropy, consistent with several embodiments of the present disclosure.
Figure 2A:
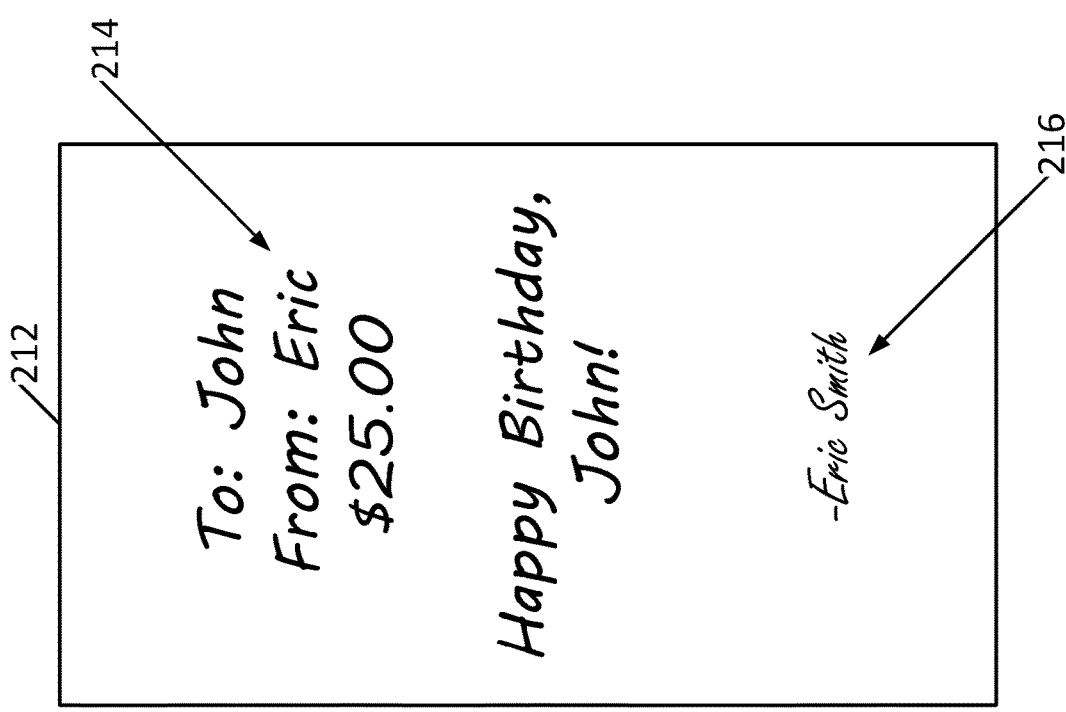
FIG. 2A illustrates an example financial instrument that a payor may have created, consistent with several embodiments of the present disclosure.

FIG. 2A illustrates an example financial instrument 212 that a payor may have created, consistent with several embodiments of the present disclosure. Instrument 212 includes text 214 (which may be handwritten), for example outlining an intended payee (here, John) and identifying the payor (here, Eric), as well as identifying a payment amount ($25.00). A payor may capture an image of this instrument and submit it to a financial instrument registration authority. The authority may analyze the image of the instrument and determine whether the instrument is satisfactorily unique. Of note, as instrument 212 includes handwriting 214 and a signature 216, the registration authority may determine that instrument 212 is unique enough as submitted and accept it. However, if the registration authority determines instrument 212 to be insufficiently unique, it may refuse registration of instrument 212 and instead prompt the payor to revise instrument 212 by adding additional entropy to it.

FIG. 2B illustrates an example revised financial instrument 222 comprising the example instrument 212 of FIG. 2A with added entropy, consistent with several embodiments of the present disclosure. The payor, after having instrument 212 rejected and being prompted to add entropy, may draw marks such as curves 224, a shape 226, and/or even a random scribble 228 on the instrument. After adding the entropy, the payor may attempt to submit revised instrument 222 to the registration authority for reconsideration. If the revised instrument 222 is sufficiently unique, the registration authority may approve the instrument, enabling it to be redeemed later by a payee. In some embodiments, even if the revised instrument 222 is sufficiently unique, the registration authority may still have requirements or restrictions based on terms of the instrument (for example, even if an instrument is unique enough, an authority may reject any instrument with a transaction amount greater than 10,000 USD).

In some embodiments, the registration authority may analyze the instrument to determine one or more terms of the financial instrument (such as, for example, by reading writing 214). In some embodiments, the terms may instead be submitted by the payor upon submission of the image or upon approval of the instrument. In some embodiments, the registration authority may prompt the payor to confirm or modify the terms determined via image analysis, as well as to submit any additional terms not detected (such as expiration date, etc.).

Figure 2C:
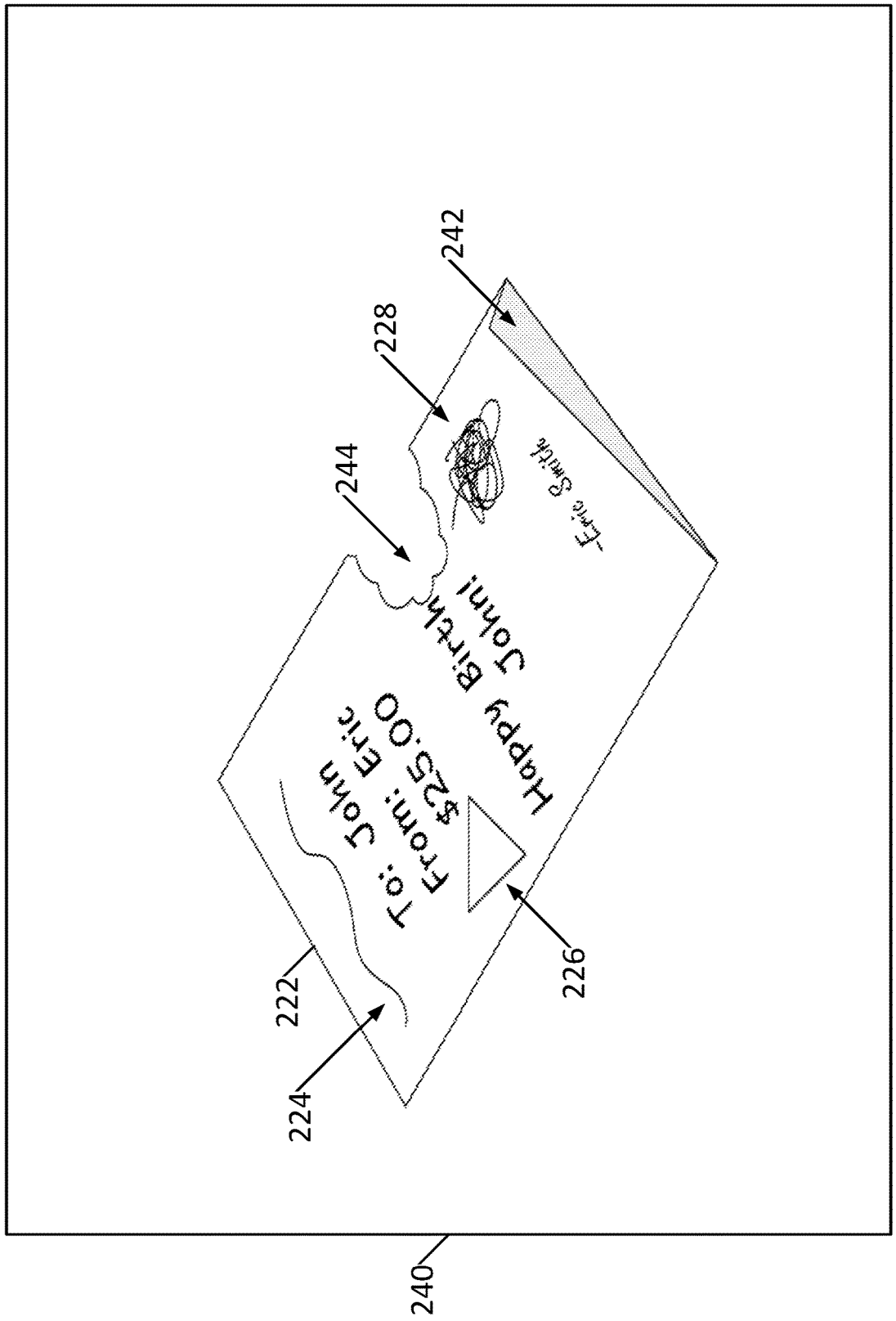
FIG. 2C illustrates an example image a payee may submit to a registration authority in an attempt to redeem a financial instrument, consistent with several embodiments of the present disclosure.

FIG. 2C illustrates an example image 240 a payee may submit to a registration authority in an attempt to redeem a financial instrument 222, consistent with several embodiments of the present disclosure. Over time, financial instrument 222 may become damaged and/or worn, such as suffering a tear 244 or being folded 242. However, due in part to the added entropy (such as curves 224, shape 226, scribble 228), a registration authority may still be able to confidently recognize the instrument in the submitted redemption image as financial instrument 222, thus enabling the payee to still redeem the instrument (assuming the terms permit).

Figure 3:
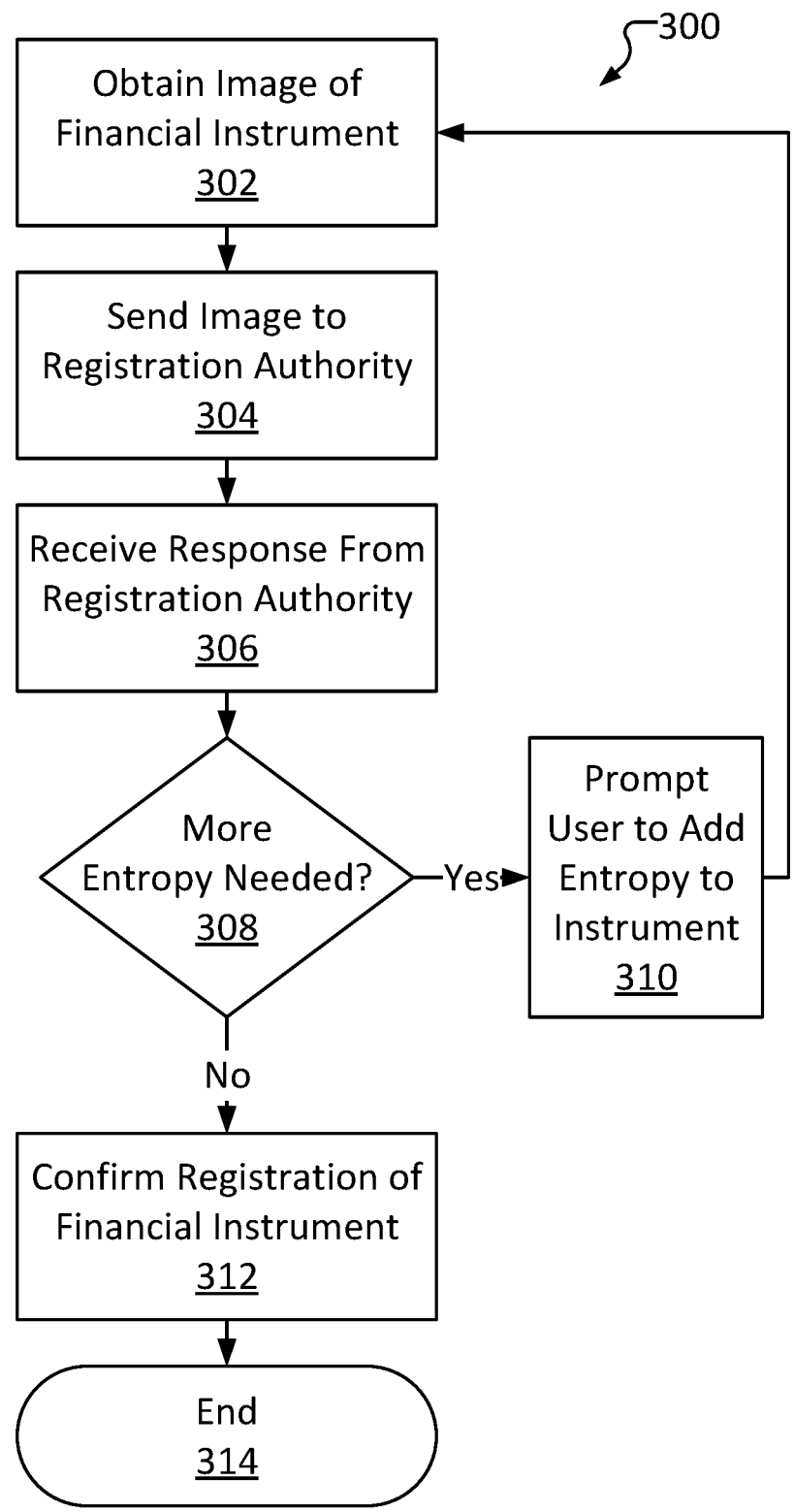
FIG. 3 illustrates a user-device-side method of registering an electronic financial instrument according to several embodiments of the present disclosure.

FIG. 3 illustrates a user-device-side method 300 of registering a financial instrument with a registration authority according to several embodiments of the present disclosure. Method 300 may be performed by, for example, a user device such as a mobile device, a desktop computer, a laptop computer, etc. Method 300 includes obtaining an image of a financial instrument at operation 302. Operation 302 may include, for example, capturing an image with a camera, receiving an image from a connected scanning device, etc. In some embodiments, operation 302 may include a user creating or modifying a digital image of an instrument.

Method 300 further includes sending the image to a registration authority at operation 304. Operation 304 may include, for example, transmitting the obtained image to a third party retailer, a bank, a "middleman" entity (e.g., a financial instrument validation and registration entity), etc. As the image of the financial instrument will be processed and/or analyzed to determine uniqueness, operation 304 may be particularly advantageous in some embodiments in which additional processing capacity is necessary or beneficial (for example, if the specific method of analysis is computationally expensive relative to the computing power of the user device receiving the image). This may be further beneficial because various registration authorities (particularly those of different industries) may have different requirements or even different methods of analyzing the image. For example, a retailer may have a relatively lower threshold for uniqueness or use a relatively simpler analysis method when compared to those of a bank. Of course, the opposite may be true as well; this depends on the configuration of the registration authority.

In order to enable an entity such as a registration authority to determine properties of the financial instrument, operation 304 may include identifying boundaries of the financial instrument within the image. In other words, operation 304 may include identifying portions of the image that actually contain the financial instrument. This may enable the registration authority to disregard irrelevant image data. This may advantageously improve instrument evaluation, as otherwise a backdrop of the image of the instrument may skew or otherwise alter results of image analysis. The boundaries may be determined by detecting them automatically (e.g., by performing edge analysis, potentially including detecting abrupt coloring, texture, or lighting changes), prompting the payor (or causing the payor's device to prompt the payor) to specify the boundaries of the instrument (such as by the payor drawing an outline of the instrument on the image), automatically considering a predetermined portion of the image as the financial instrument, or a combination of one or more of the above.

Method 300 further includes receiving a response from the registration authority at operation 306. Operation 306 may include, for example, receiving results of a determination of whether the image of the financial instrument meets one or more standards held by the registration authority.

Using the response, method 300 further includes determining whether the instrument requires additional entropy to be sufficiently unique at operation 308. Operation 308 may depend on the information received at operation 306. For example, in some embodiments, the response received at operation 306 may include a decision of whether the registration authority considers the instrument sufficiently unique, in which case operation 308 may be based directly on that decision. For example, if the response received at operation 306 indicates that the registration authority concluded that the image of the instrument is acceptable, this may result in determining that the instrument does not require additional entropy (308 "No"). The reverse also holds; if the response received at operation 306 indicates that the instrument is not sufficiently unique, this may indicate that the instrument does require additional entropy (308 "Yes").

If the financial instrument is not sufficiently unique (308 "No"), method 300 further includes prompting the user to add entropy to the instrument at operation 310. Operation 310 may include, for example, suggesting adding one or more marks, curves, drawings, lines, etc. to visibly modify and further distinguish the instrument. The user may be prompted via, for example, a text-based notification, an audible instructions, a visible indication (e.g., red X vs. green check mark), etc. In some embodiments, the nature of the prompt may be based on the response received at operation 306 and/or the determination made at operation 308. For example, if the registration authority responded with an indication that the financial instrument does not include enough curved lines to be considered "unique," the prompt of operation 310 may include a message suggesting that the user add more curved lines. Other various specialized suggestions are also possible.

If the instrument is sufficiently unique (308 "Yes"), method 300 further includes confirming registration of the instrument at operation 312. Operation 312 may include, for example, receiving a response from the registration authority that the financial instrument is "active" and ready to be redeemed (assuming the terms are satisfied). In some embodiments, operation 312 may include notifying a user (such as a payor of the instrument) that the registration was successful and the instrument is now "active." Upon confirmation of registration at operation 312, method 300 ends at block 314.

Figure 4:
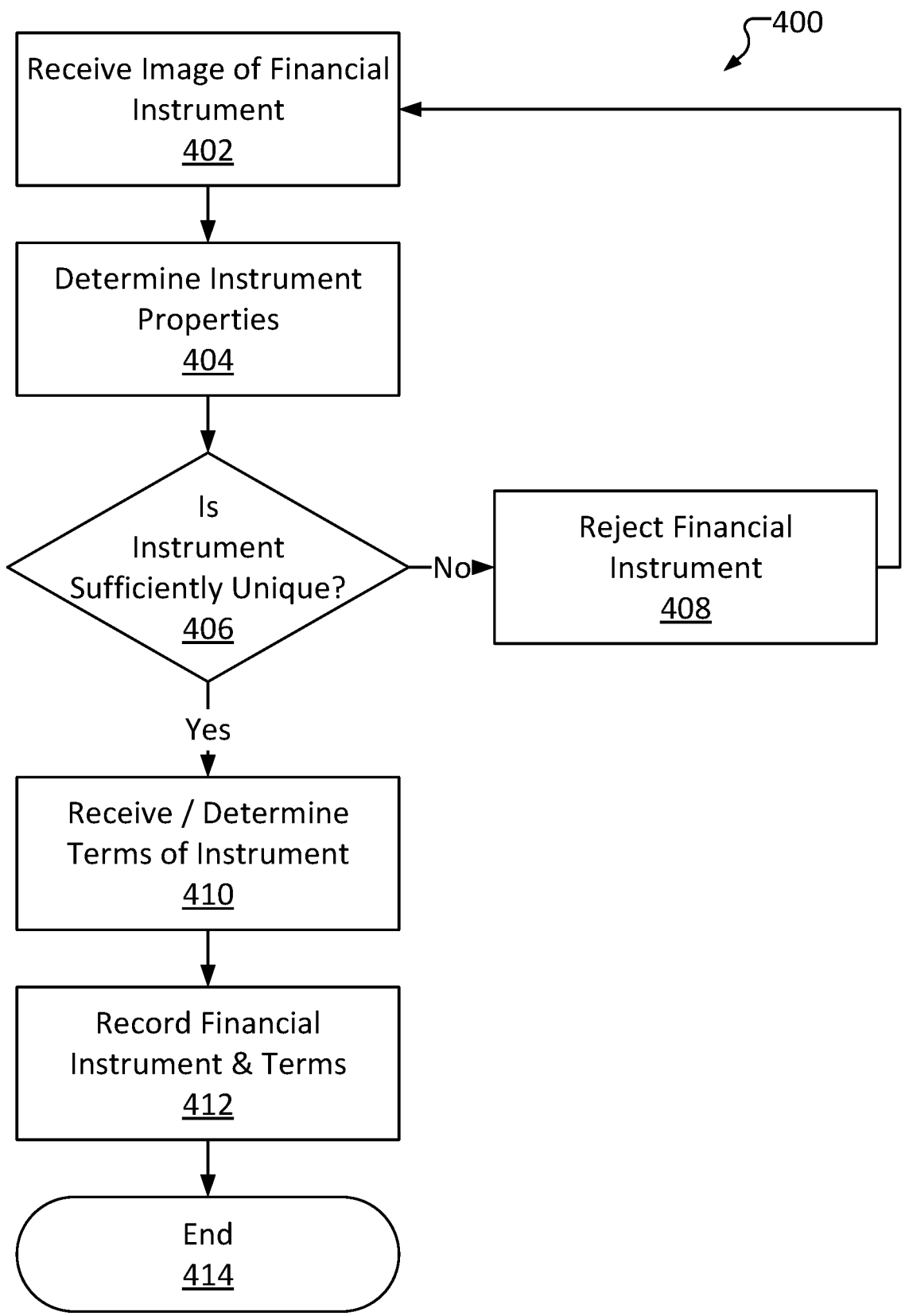
FIG. 4 illustrates a server-side method for remotely registering and recording an electronic financial instrument according to several embodiments of the present disclosure.

FIG. 4 illustrates a server-side method 400 for remotely registering and recording an electronic financial instrument according to several embodiments of the present disclosure. Method 400 includes receiving an image of a financial instrument at operation 402. The image may be received from a user device such as, for example, a payor's mobile device. The image may be received via an electronic communications protocol (e.g., over the internet, via a hardwired connection, etc.).

Method 400 further includes determining properties of the financial instrument at operation 404. Operation 404 may be performed via one or more image processing algorithms such as, for example, near duplicate image detection. Operation 404 may include determining a count of curves, corners, straight lines, patterns, and other features of the image. The instrument properties may be used to determine a level of "uniqueness" or "entropy" of the instrument. This level of uniqueness may be represented as one or more numerical values. In some embodiments, uniqueness may be further based upon comparison to images stored in a database, such as a blockchain ledger.

Method 400 further includes determining whether the instrument is "sufficiently" unique 406. This may include, for example, comparing the level of uniqueness to one or more thresholds. The thresholds may be a preset value. In some embodiments, the thresholds may be determined based on the terms of the financial instrument (for example, instruments for larger monetary amounts may be held to a higher standard and thus the threshold may be higher). In some embodiments, the threshold may be based on the registration authority or parties to a potential transaction; for example, if the instrument is a retail gift card, the threshold may be selected by the retailer. Thus, different entities may have varying uniqueness requirements. In some embodiments, a baseline minimum level of uniqueness may be enforced regardless of registration authority settings.

If the financial instrument is not sufficiently unique (406 "No"), method 400 includes rejecting the financial instrument at operation 408. Operation 408 may include, for example, sending a response to a payor's device indicating that the financial instrument does not meet a uniqueness standard set by a system performing method 400 (such as a registration authority). For example, operation 408 may include prompting the payor to add entropy to the instrument. In some embodiments, operation 408 may include sending a notification to a user device that the instrument is not unique enough (such that the user device itself can deliver a prompt). In some embodiments, operation 408 may include sending a prompt to a payor via more direct means. For example, if a system performing method 400 can glean a payor identity (such as from the device from which the image was received) including contact information, operation 408 may include leveraging that contact information to directly prompt the payor that the received instrument is not unique enough. This may be achieved through, for example, an email, a text message, a push notification, etc. Method 400 then returns to operation 402 (i.e., receive another image of an instrument), etc.

If the instrument is sufficiently unique (406 "Yes"), method 400 further includes receiving and/or determining terms of the financial instrument at operation 410. As described above, the instrument's terms may include parameters of the instrument such as allocated funds, identity of who may redeem the instrument (i.e., the payee) and/or when the instrument may or may not be redeemed, etc. In some embodiments, the terms may be determined 410 via analysis of the image (reading a "to:" field, identifying a number associated with a currency sign such as $, etc., such as reading writing 214 of instrument 212 of FIG. 2A). In some embodiments, the terms may simply be received (for example, from the user submitting the instrument for registration, such as the payor). In some embodiments, some terms may be determined automatically via analysis while other terms may be received.

In some embodiments, received terms may be compared against terms gleaned from the image. This may be useful, for example, to verify the received terms or the gleaned terms. For example, if analysis of the image of the financial instrument suggests that the instrument is for ten US Dollars (USD), but the payor also submitted terms alongside the image identifying that the instrument is for ten thousand USD, a system performing method 400 may identify this inconsistency to the payor. In some embodiments, terms recorded with the instrument may actually "conflict" with terms written on the instrument itself. For example, an instrument with "$25.00" written on the instrument itself may actually be redeemed for $30.00, assuming the payor confirmed the amount as $30.00. In some embodiments, inconsistent terms (i.e., terms that, as identified from the image itself, contradict information submitted by the user) may result in a rejection of the instrument—the system may notify the payor that the instrument will not be recorded unless both "sources" of instrument terms align. In some embodiments, a system performing method 400 may require confirmation of the payor-submitted terms to prevent user mistakes or image-analysis mistakes. The system may proceed with method 400 upon receipt of payor confirmation. In some embodiments, the system may not notify the payor of a conflict at all and may simply defer to payor-submitted information. Further, in some embodiments the system may not analyze the image for terms that have been directly submitted by the payor. This may conserve system resources and increase processing speed.

In some embodiments, in order to determine whether the terms of the financial instrument include specific thresholds (or other information that may inform uniqueness requirements), a system performing method 400 may receive some or all terms of the financial instrument prior to or as part of the determination at operation 406. For example, in at least one embodiment, after receiving instrument properties at operation 404, method 400 may include receiving and/or determining whether the instrument has specified its own uniqueness threshold (but not other terms, such as timing restrictions, which may not have an impact on the determination 406). Then, based on either the specified threshold or a default threshold, method 400 may proceed to determine whether the instrument is sufficiently unique at operation 406. In this embodiment, operation 410 may then include receiving and/or determining the remaining terms of the instrument. Optionally, operation 410 may omit receiving or determining terms that were already receiving or determined prior to operation 406 (so as to avoid redundant computation). However, in view of the light resource consumption (particularly in view of the relatively data-heavy image transmission), it may be advantageous to receive all terms at operation 410 in the interest of verifying those terms that had already been received.

In some embodiments, rather than simply receiving and/or determining terms that may impact or inform uniqueness requirements, the entirety of operation 410 may be performed prior to or as a part of determination 406. For example, in some embodiments, all terms may be received and/or determined before image analysis begins. In at least one embodiment, a "barebones" check for uniqueness may be performed first using an image analysis method or settings thereof which requires relatively little computational resources at the cost of reduced confidence/granularity. If an instrument passes such a "barebones" check, some or all terms may be received and/or determined, after which a "full" check may be performed at 406. If the instrument is sufficiently unique (406 "Yes"), any remaining terms may then be received and/or determined at operation 410.

Method 400 further includes recording the financial instrument and its terms at operation 412. "Recording the instrument" may refer to, for example, adding data representing the financial instrument and/or its properties, such as a copy or a portion of the image of the financial instrument (i.e., the image analyzed at operation 404) and its terms in, for example, a database, a blockchain ledger, etc. In some embodiments, rather than adding the entire image of the financial instrument into the blockchain or database, the image of the instrument may be parsed, compressed and/or further processed into financial instrument image data. This image data may be added to the blockchain or database in order to conserve storage space. In some embodiments, operation 412 may include compressing or otherwise processing the image of the financial instrument and storing data resulting from the compression and/or processing in order to reduce a storage footprint. For example, operation 412 may include performing an image normalization process on the image, hashing the normalized image and storing the hash of the normalized image. Operation 412 may include storing the terms acquired at operation 410 as well.

In some embodiments, depending upon the terms of the instrument, funds may need to be allocated, verified or transferred as a part of operation 412 before the instrument may be considered "valid" and therefore eligible to be redeemed. Attempting to redeem such an instrument before this validation completes may result in an error, but in some embodiments, the error may specify that a match was identified but the instrument is not yet valid.

In embodiments wherein operation 412 includes storing the instrument and its terms in a blockchain ledger, the ledger may take the form of or include a "smart contract," a blockchain-based contract configured such that when one or more conditions are met (such as an image matching the instrument is submitted for redemption by a payee), an action, such as transferring funds, is automatically performed with no further required input from the payor or payee.

Figure 5:
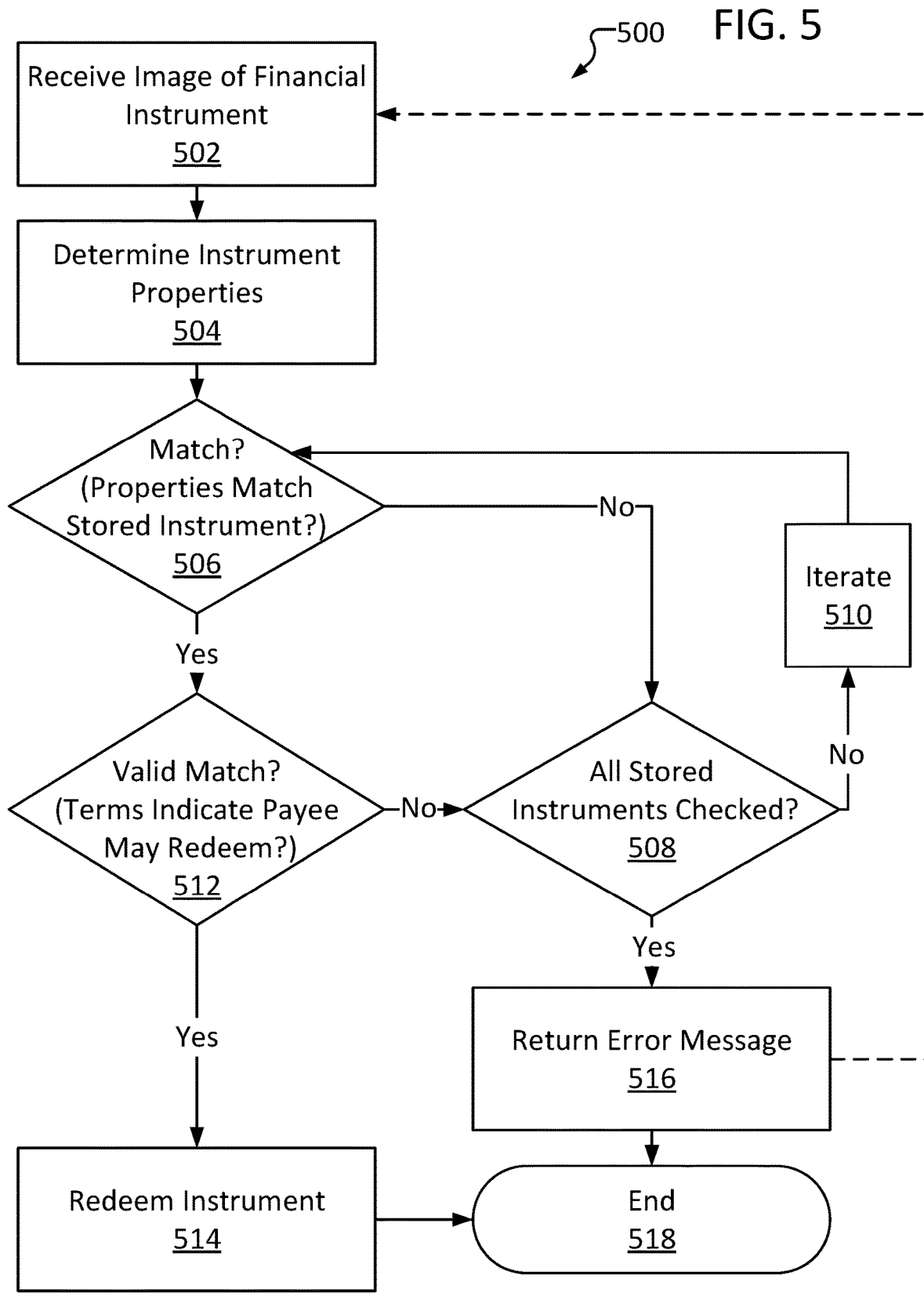
FIG. 5 illustrates a server-side method for redeeming an electronic financial instrument according to several embodiments of the present disclosure.

FIG. 5 illustrates a server-side method 500 for redeeming an electronic financial instrument according to several embodiments of the present disclosure. Method 500 may be performed by, for example, one or more cloud computing systems such as system 600. Method 500 includes receiving an image of a financial instrument for redemption from a payee at operation 502. For example, a payee may take a photograph of a handwritten financial instrument with a camera of the payee's mobile device and upload the photo to a server.

Method 500 further includes determining properties of the financial instrument at operation 504. This may include, for example, identifying a portion of the received image containing the financial instrument and performing one or more image-processing or analysis methods on that portion of the image (e.g., to determine a number of curves, a number of straight lines, recognizable shapes, their orientation, relative position, size, etc. included in the instrument). For example, operation 504 may include determining that an instrument includes five curves and eight straight lines, where three of the five curves are roughly the same size and orientation, but are spaced apart by two inches each, etc.

In some embodiments, operation 504 may also include an image quality check, verifying that lighting, focus, clarity, etc. of the image are sufficient to identify properties of the instrument. If the image quality is so poor as to likely prevent accurate determination of properties of the instrument itself, operation 504 may reject the instrument and/or prompt the payee to submit a different image (e.g., by taking another photograph of the instrument and uploading it).

Operation 504 may include detecting one or more relatively unique properties of the received financial instrument. This may advantageously speed the match checking process, as a system performing method 500 may prioritize searching stored instruments for the detected unique properties. Using the example of FIG. 2C, upon receiving image 240, a system performing method 500 may detect that the properties of the "random scribble" 228 (the number of curves, their orientation relative to each other, their average arc length, number of changes to arc length above a pre-determined threshold, the location relative to the rest of the financial instrument, etc.) are relatively unique. Thus, upon receiving an image such as image 240, a system performing method 500 may specifically scan stored instruments for an instrument that also includes scribble 228. Unique properties may be detected based upon, for example, a comparison algorithm such as near-duplicate image detection ("NDID"). For example, operation 504 may include running NDID in a blockchain storing images of financial instruments.

Method 500 then includes iterating through stored financial instruments to determine whether the submitted instrument matches a stored instrument. Due to the entropy/uniqueness requirement when creating the instrument, this can be accomplished by comparing properties of the received instrument to those of the various stored instruments. Thus, method 500 further includes determining whether a stored financial instrument matches the financial instrument in the received image at operation 506.

Operation 506 may include selecting a stored instrument and comparing the selected instrument to the submitted instrument to determine if the two instruments match. Operation 506 may include, for example, selecting an instrument stored in a blockchain ledger or database. The blockchain ledger or database may include images and/or properties of financial instruments as well as terms associated with those instruments. The associated terms may include information such as payor identity, payee identity or identities (as some financial instruments may restrict redemption to one or more specific parties), indications of whether or not the instrument has been redeemed (and by whom), payment amount, timing information (restrictions, expirations and the like), etc. In some embodiments, identifying information of payors and payees may be anonymized, encrypted, and deleted upon redemption of the financial instrument. Operation 506 may include selecting an instrument to compare from a plurality of stored instruments at random or based on a preference (e.g., oldest first, newest first, highest payment value first, etc.).

With an instrument selected for comparison, operation 506 further includes determining whether the properties of the submitted instrument match the stored instrument. In some embodiments, operation 506 may perform this comparison by determining whether a relatively unique property or feature of the received instrument is present in the stored instrument. Using the image 240 of FIG. 2C as an example, operation 506 may determine whether the selected stored instrument includes scribble 228. However, even if the specific unique feature is not detected in the selected instrument, operation 506 may still compare other parameters of the instruments as a "failsafe." In some embodiments, operation 506 may implement one or more image analysis/comparison methods such as, for example, near duplicate image detection. In some embodiments, operation 506 may compare numerical values of instrument properties (such as, as described above, number, position, orientation, size of curves, straight lines, etc.) to those of the stored instrument in the database/blockchain.

Operation 506 may include determining whether the properties of the submitted instrument are within a margin of error of one or more stored instruments. In some embodiments, a margin of error may vary between different instruments. For example, terms of a financial instrument may include a specific margin of error (specified by the payor). In some embodiments, operation 506 may include determining whether the terms of the stored instrument include a specified margin of error, and if not, using a default margin of error. In some embodiments, even if the terms of the instrument do not specifically identify a margin of error, operation 506 may include determining a margin of error based on the terms. For example, financial instruments for a relatively high transaction amount may result in a stricter margin of error comparison at operation 506. In some embodiments, a specified margin of error may be considered unacceptably insecure (as an extreme example, a margin of error of 50% may be so high as to enable forgery, even inadvertently) so operation 506 may include enforcing a "maximum" margin of error, which is not necessarily identical to a "default" margin of error. For example, a "default" margin of error may be 2%, but terms may specify their own margin of error up to a "maximum" of 10%. For example, if the image of the instrument to be redeemed is within a 2% margin of error on every property of a stored instrument, operation 506 may include determining whether the stored instrument has a specified (and acceptably secure) margin of error, and whether 2% is within that margin of error (or a default margin of error, if none is specified).

If the properties of the selected instrument do not match those of the submitted instrument (506 "No"), then method 500 includes iterating through remaining stored instruments (i.e., determining whether all stored instruments have been checked at operation 508 and, if not, iterating via operation 510 to select another stored instrument for comparison). If all instruments have been checked and no matches exist (508 "Yes"), method 500 further includes returning an error message at operation 516. Operation 516 may include, for example, informing the payee that no matching instrument was found. In some embodiments, method 500 may then end at block 518.

However, in some embodiments, after returning the error 516, rather than ending 518, method 500 may return to operation 502 to permit the payee to submit another image. This possibility is indicated by a dashed line in FIG. 5. In some embodiments, operation 516 may include instituting a "cooldown" on submitting another image to prevent malicious automated "brute force" attempts to redeem "open-ended" financial instruments (i.e., instruments without a specified recipient, allowing anybody to redeem). This cooldown may range from, for example, less than a second to multiple seconds or longer, and may be increased based on number of unsuccessful attempts (i.e., images submitted that resulted in no match). In some embodiments, this delay (or a similar delay) may be implemented elsewhere in the process, such as after receiving the image at operation 502.

In some embodiments, if the financial image to be redeemed is a poor match for all stored financial instruments (506 "No" & 508 "Yes"), a system performing method 500 may trigger a fraud alert. For example, the system may forward the redemption image to be redeemed to a professional reviewer to account for the possibility that the user submitting the image is maliciously attempting to redeem a false financial instrument. As an example, a user may attempt to create a relatively generic financial instrument and submit it for redemption in the hopes that it just so happens to match a stored financial instrument. This may be detected if a submitted image is less than, for example, a 75% match for any stored financial instrument.

Returning to the image comparison at operation 506, if properties of the submitted instrument match those of the selected instrument within the appropriate margin of error (e.g., a margin of error specified in the instrument's terms, a default margin of error, a maximum margin of error, etc.) (506 "Yes"), method 500 includes determining whether the user is eligible to redeem the instrument at operation 512. For example, operation 512 may include determining whether the instrument has any terms that may impact redeeming the instrument. Such terms may include, for example, eligible recipients, timing restrictions, how many times the eIOU may be redeemed, etc. If the selected instrument is associated with terms that may restrict redemption, operation 512 further includes determining whether the terms are satisfied, such as by comparing the terms to corresponding values (for example, an identity of the payee attempting to redeem (if necessary), a current date/time, etc.). If the selected instrument has no such "restricting" terms, operation 512 defaults to "Yes." In some embodiments, the eligibility check of operation 512 may be performed before the instrument match check of operation 506, as the eligibility check of operation 512 may advantageously rule out "non-matches" based simply on terms without requiring a system performing method 500 to perform more computationally heavy image processing of operation 506.

If the payee is ineligible to redeem the selected instrument (512 "No"), method 500 further includes iterating through any remaining stored instruments as described above (i.e., via operations 508, 510 and/or 516).

If the terms indicate that the payee may redeem the financial instrument (512 "Yes"), method 500 further includes redeeming the instrument at operation 514. Operation 514 may include, for example, causing funds to be transferred or allocated based on the terms of the instrument. For example, in some embodiments, operation 514 may include transferring funds from a first bank account to a second bank account. In some embodiments, operation 514 may include presenting the payee with a code or message enabling the payee to redeem funds. For example, upon redeeming an instrument, a payee may be sent an alphanumeric gift code which the payee may redeem with a retailer for funds. This enables a payor to effectively create a physical financial instrument (such as a tangible gift card) without needing to visit a retailer location or wait for one to be mailed.

In some embodiments, terms of the instrument may be configured such that redeeming the instrument at operation 514 may include executing a smart contract outlined in a blockchain. These terms may include, for example, causing a digital transfer of ownership of various goods (where the ownership had been transferred to a holding entity upon creation of the financial instrument), sending a prerecorded message, etc. In some embodiments, once the instrument redemption at operation 514 is complete, method 500 may end at block 518.

In some embodiments, even if a match is detected (506 "Yes" & 512 "Yes"), method 500 may continue to determine if any other matches exist. If properties of the received instrument are within the margin of error of multiple financial instruments, operation 514 may include selecting one of the stored instruments to redeem. The selection may be based on one or more factors such as strength of the match (for example, which comparison had the smallest margin of error), on uniqueness (selecting the most unique stored instrument whose match was within the relevant margin of error), etc. In some embodiments, all matched instruments are redeemed at operation 514. In some embodiments, the user may be presented with some or all of the terms (such as payor) for each match and prompted to select which instrument the payee intends to redeem. In some embodiments, once all stored instruments have been checked and an instrument has been redeemed, method 500 may end at block 518.

In some embodiments, an image received at operation 502 may not necessarily be captured by the payee. For example, in at least one embodiment, a payor may send a copy of the registering image (e.g., the image captured or otherwise received at operation 302) to the payee, and the payee may submit this registering image for redemption. This may circumvent a need for the payee to capture a redemption image of the financial instrument. In addition, in some embodiments a preliminary check for "exact matches" may be made upon receipt of a redemption image; if the redemption image is identical to a recorded image of a valid instrument, this may be considered a match (e.g., a system may skip performing image analysis to determine properties of the redemption image in order to save computational resources). In some of these embodiments, even in the case of an exact match, subsequent validation checks may still need to be performed, depending upon the terms associated with the financial instrument).

However, the possibility that a registration image is misappropriated is also considered herein. For example, if a payor's device is compromised, copies of registration images may be intercepted and/or stolen and submitted for redemption by a malicious actor without possession of the financial instruments the images depict/represent. Thus, in some embodiments, a similar preliminary "exact match" check may be performed, but with the opposite conclusion; if an exact match is found, the redemption attempt may be immediately rejected, optionally followed by prompting the "payee" to capture a new image of the financial instrument in order to attempt to redeem. Further, malicious actors may attempt to circumvent such protections by digitally altering the misappropriated registration image (via, for example, applying one or more filters, changing an aspect ratio, or more specific and targeted modifications) and submitting the altered image for redemption. In some embodiments, for example if security is particularly important, additional image analysis methods may be performed on a redemption image to determine whether the redemption image has been digitally altered.

As described above, a user (payor) may create an instrument to, for example, represent a gift card to a specific retailer. In some embodiments, the retailer itself may be involved in the financial instrument process, in which case the retailer may receive funds from the user's bank account and hold the funds until the instrument is redeemed.

However, in some embodiments, the financial instrument system may be agnostic to at least one party. In keeping with the "retailer" example, in some embodiments, creation of the instrument may, on the server side, constitute purchasing a gift code from the retailer and storing the gift code in association with the financial instrument. Thus, redemption of the instrument may result in transmitting the gift code to a redeeming payee. The retailer may only receive the funds, generate and send the gift code, then receive and honor the gift code—in other words, the retailer need not participate in (or even necessarily "know" about) the financial instrument creation, validation, or redemption process.

In some embodiments, a payor may be enabled to create an instrument despite not being connected to the internet (e.g., without access to a database of existing instruments or bank accounts etc.). Such an instrument may not be "validated" until a connection can be established (and any necessary verifications with banks etc. completed), but a user device may be able to determine whether the instrument is sufficiently unique (for example, as operation 104 of method 100 as discussed with reference to FIG. 1) and guide the payor to add entropy until it is.

In some embodiments, the payor's device may perform the uniqueness determinations during instrument creation. For example, with reference to FIG. 3, the response received at operation 306 may simply include raw data results of image analysis and/or processing. In at least these embodiments, operation 308 may include interpreting these results (e.g., comparing the data to one or more thresholds) to assess uniqueness "locally." Thus, the determination made in operation 308 may be based on this analysis. In these embodiments, the registration authority may simply return results of image analysis (including, for example, properties of the instrument). For example, with reference to FIG. 4, a registration authority may send these properties as a part of operation 404, and operation 406 may be performed as a "check" or "verification" that the analysis performed by the payor's device is accurate.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
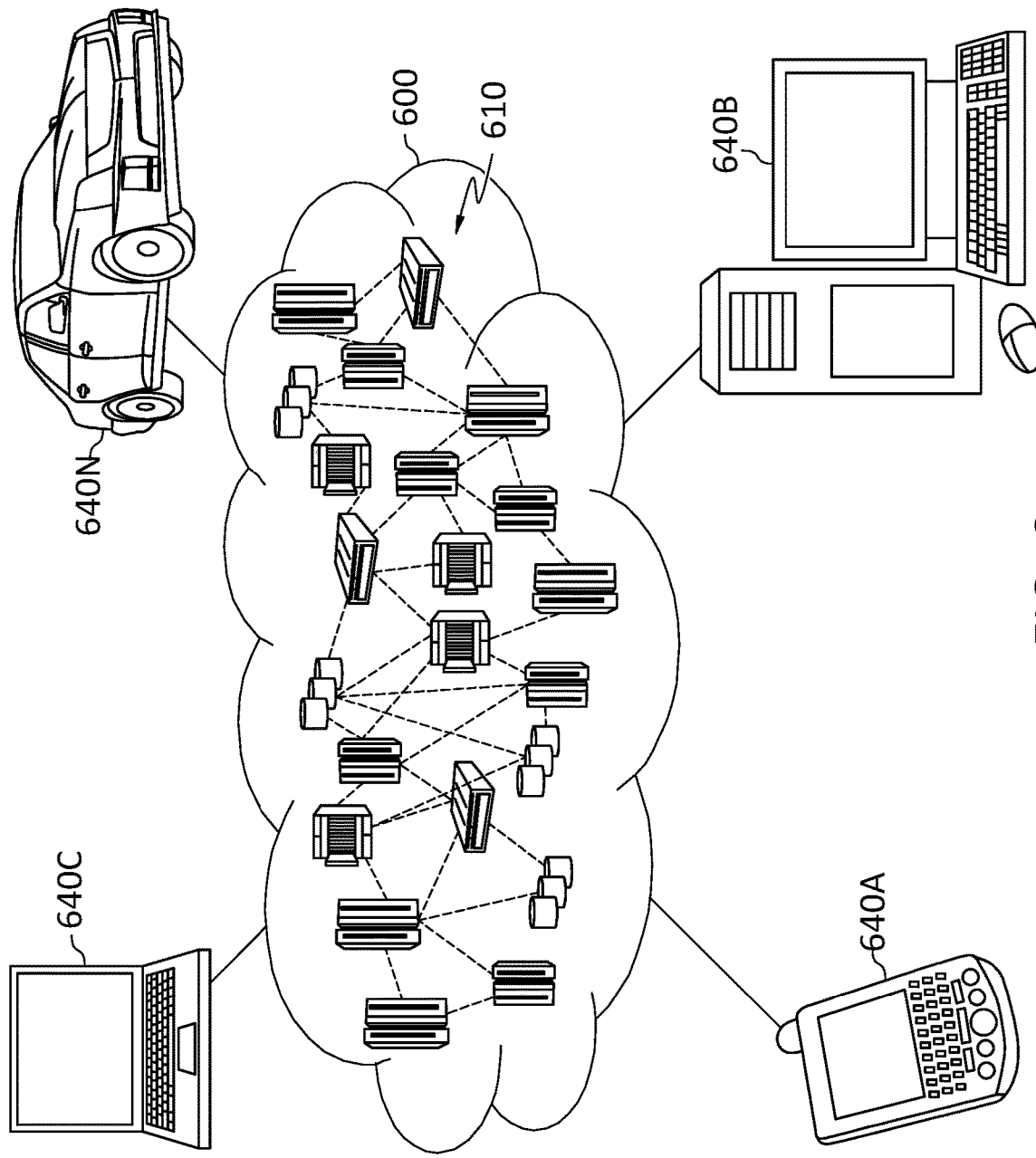
FIG. 6 depicts a cloud computing environment according to an embodiment of the present disclosure.

Referring now to FIG. 6, illustrative cloud computing environment 600 is depicted. As shown, cloud computing environment 600 comprises one or more cloud computing nodes 610 with which local computing devices used by cloud consumers, such as, for example, personal digital assistant (PDA) or cellular telephone 640A, desktop computer 640B, laptop computer 640C, and/or automobile computer system 640N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 640A-N shown in FIG. 6 are intended to be illustrative only and that computing nodes 610 and cloud computing environment 600 can communicate with any type of computerized device over any type of network and/or network addressable connection (e.g., using a web browser).

Figure 7:
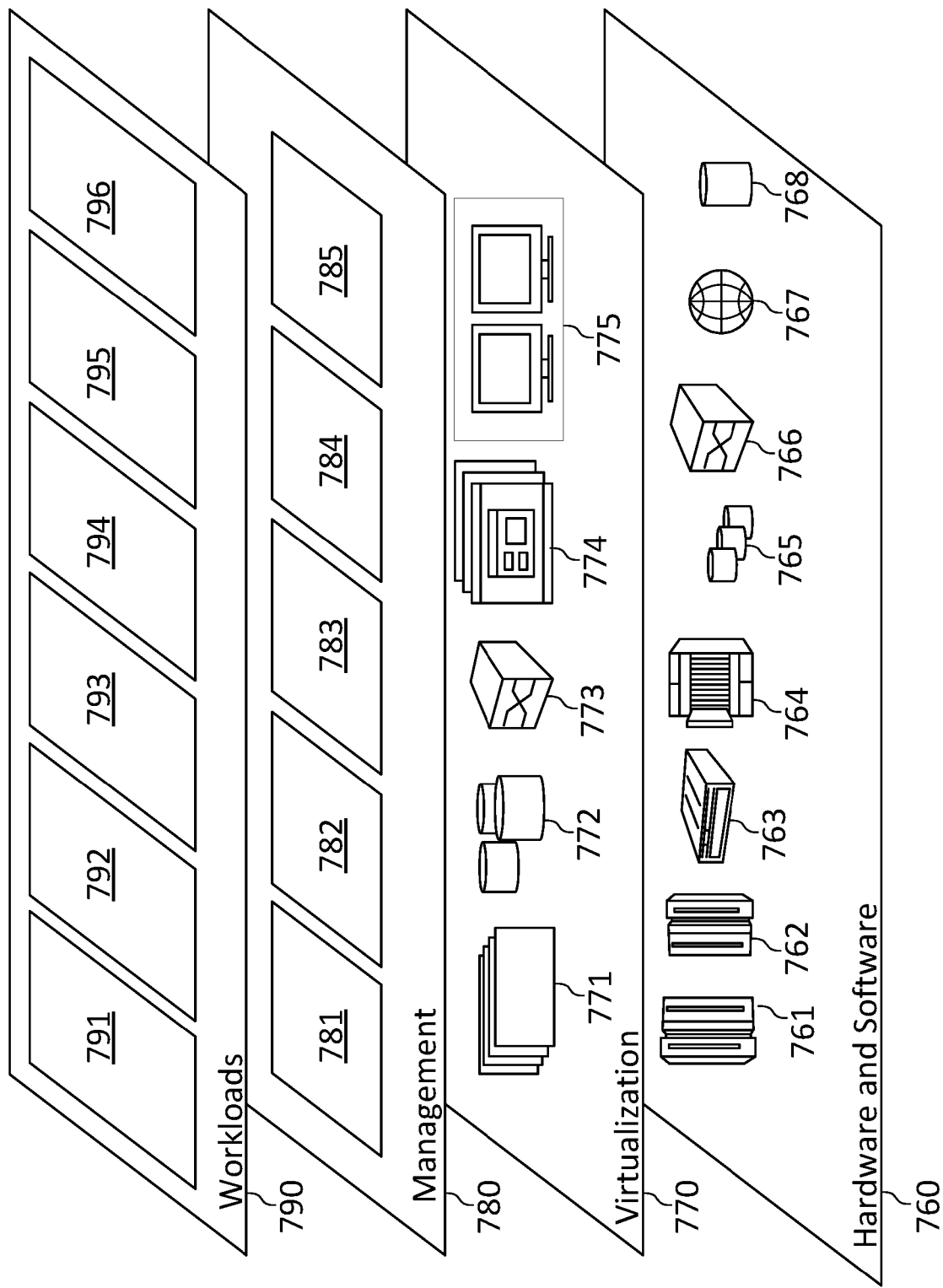
FIG. 7 depicts abstraction model layers according to an embodiment of the present disclosure.

Referring now to FIG. 7, a set of functional abstraction layers provided by cloud computing environment 600 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and financial instrument creation and redemption 796.

Figure 8:
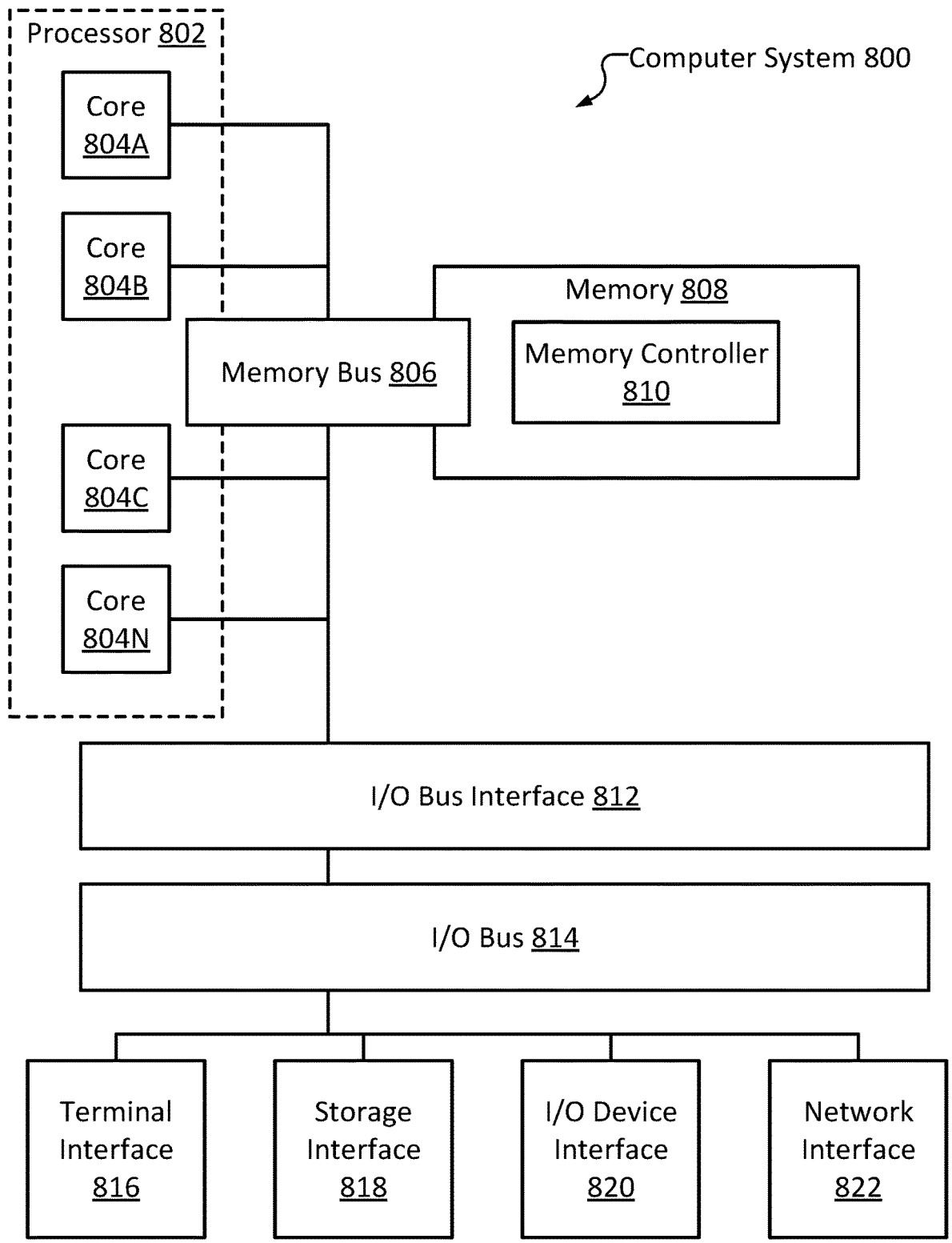
FIG. 8 illustrates a high-level block diagram of an example computer system that may be used in implementing embodiments of the present disclosure.

Referring now to FIG. 8, shown is a high-level block diagram of an example computer system 800 that may be configured to perform various aspects of the present disclosure, including, for example, methods 100, 300, 400 and/or 500. The example computer system 800 may be used in implementing one or more of the methods or modules, and any related functions or operations, described herein (e.g., using one or more processor circuits or computer processors of the computer), in accordance with embodiments of the present disclosure. In some embodiments, the major components of the computer system 800 may comprise one or more CPUs 802, a memory subsystem 808, a terminal interface 816, a storage interface 818, an I/O (Input/Output) device interface 820, and a network interface 822, all of which may be communicatively coupled, directly or indirectly, for inter-component communication via a memory bus 806, an I/O bus 814, and an I/O bus interface unit 812.

The computer system 800 may contain one or more general-purpose programmable central processing units (CPUs) 802, some or all of which may include one or more cores 804A, 804B, 804C, and 804D, herein generically referred to as the CPU 802. In some embodiments, the computer system 800 may contain multiple processors typical of a relatively large system; however, in other embodiments the computer system 800 may alternatively be a single CPU system. Each CPU 802 may execute instructions stored in the memory subsystem 808 on a CPU core 804 and may comprise one or more levels of on-board cache.

In some embodiments, the memory subsystem 808 may comprise a random-access semiconductor memory, storage device, or storage medium (either volatile or non-volatile) for storing data and programs. In some embodiments, the memory subsystem 808 may represent the entire virtual memory of the computer system 800 and may also include the virtual memory of other computer systems coupled to the computer system 800 or connected via a network. The memory subsystem 808 may be conceptually a single monolithic entity, but, in some embodiments, the memory subsystem 808 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 804 may contain elements for control and flow of memory used by the CPU 802. This may include a memory controller 810.

Although the memory bus 806 is shown in FIG. 8 as a single bus structure providing a direct communication path among the CPU 802, the memory subsystem 808, and the I/O bus interface 812, the memory bus 806 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 812 and the I/O bus 814 are shown as single respective units, the computer system 800 may, in some embodiments, contain multiple I/O bus interface units 812, multiple I/O buses 814, or both. Further, while multiple I/O interface units are shown, which separate the I/O bus 814 from various communications paths running to the various I/O devices, in other embodiments some or all of the I/O devices may be connected directly to one or more system I/O buses.

In some embodiments, the computer system 800 may be a multi-user mainframe computer system, a single-user system, or a server computer or similar device that has little or no direct user interface but receives requests from other computer systems (clients). Further, in some embodiments, the computer system 800 may be implemented as a desktop computer, portable computer, laptop or notebook computer, tablet computer, pocket computer, telephone, smart phone, mobile device, or any other appropriate type of electronic device.

It is noted that FIG. 8 is intended to depict the representative major components of an exemplary computer system 800. In some embodiments, however, individual components may have greater or lesser complexity than as represented in FIG. 8, components other than or in addition to those shown in FIG. 8 may be present, and the number, type, and configuration of such components may vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method, comprising:
    receiving an image of a financial instrument;
    determining one or more properties of the financial instrument based on the image;
    determining a uniqueness rating of the financial instrument based on the properties;
    determining, based on the uniqueness rating, that the financial instrument is sufficiently unique, wherein determining that the financial instrument is sufficiently unique comprises:
        comparing the uniqueness rating to a threshold;
        responsive to the uniqueness rating being below the threshold, prompting a payor to cut the financial instrument into a different shape;
        receiving, after the prompting, an updated image of the financial instrument after the financial instrument has been cut;
        updating a uniqueness rating of the financial instrument based on the updated image; and
        comparing, after the updating the uniqueness rating, the uniqueness rating to the threshold;
    identifying terms of the financial instrument; and
    recording, in response to the determining that the financial instrument is sufficiently unique, the financial instrument and terms in a digital storage base.

2. The method of claim 1, wherein the prompting further includes suggesting that the payor scribble on the financial instrument.

3. The method of claim 1, further comprising comparing the financial instrument to one or more other financial instruments stored in the digital storage base, wherein the uniqueness rating is determined based further upon results of the comparison.

4. The method of claim 1, wherein the recording the financial instrument comprises storing the properties in the digital storage base.

5. The method of claim 1, wherein the terms of the financial instrument include a maximum number of times the financial instrument may be redeemed.

6. The method of claim 1, wherein the financial instrument is completely handwritten.

7. The method of claim 1, wherein determining that the financial instrument is sufficiently unique comprises:
    concluding, after the updating the uniqueness rating, that the uniqueness rating is above the threshold.

8. A system comprising:
    a memory; and
    a central processing unit (CPU) including one or more CPU cores configured to:
        receive an image of a financial instrument;
        determine one or more properties of the financial instrument based on the image;
        determine a uniqueness rating of the financial instrument based on the properties;
        determine, based on the uniqueness rating, that the financial instrument is sufficiently unique, wherein determining that the financial instrument is sufficiently unique comprises:
            comparing the uniqueness rating to a threshold;
            responsive to the uniqueness rating being below the threshold, prompting a payor to cut the financial instrument into a different shape;
            receiving, after the prompting, an updated image of the financial instrument after the financial instrument has been cut;
            updating a uniqueness rating of the financial instrument based on the updated image; and
            comparing, after the updating the uniqueness rating, the uniqueness rating to the threshold;
        identify terms of the financial instrument; and
        record, in response to the determining that the financial instrument is sufficiently unique, the financial instrument and terms in a digital storage base.

9. The system of claim 8, wherein the prompting further includes suggesting that the payor scribble on the financial instrument.

10. The system of claim 8, wherein the CPU is further configured to compare the financial instrument to one or more other financial instruments stored in the digital storage base, wherein the uniqueness rating is determined based further upon results of the comparison.

11. The system of claim 8, wherein the financial instrument contains text that is not handwritten.

12. The system of claim 8, wherein determining that the financial instrument is sufficiently unique comprises:
    concluding, after the updating the uniqueness rating, that the uniqueness rating is above the threshold.

13. A computer program product, the computer program product comprising a computer readable storage medium having program instructions embodied therewith, the program instructions executable by a computer to cause the computer to:
    receive an image of a financial instrument;
    determine one or more properties of the financial instrument based on the image;
    determine a uniqueness rating of the financial instrument based on the properties;

determine, based on the uniqueness rating, that the financial instrument is sufficiently unique, wherein determining that the financial instrument is sufficiently unique comprises:
comparing the uniqueness rating to a threshold;
responsive to the uniqueness rating being below the threshold, prompting a payor to cut the financial instrument into a different shape;
receiving, after the prompting, an updated image of the financial instrument after the financial instrument has been cut;
updating a uniqueness rating of the financial instrument based on the updated image; and
comparing, after the updating the uniqueness rating, the uniqueness rating to the threshold;
identify terms of the financial instrument; and
record, in response to the determining that the financial instrument is sufficiently unique, the financial instrument and terms in a digital storage base.

14. The computer program product of claim 13, wherein the prompting further includes suggesting that the payor draw on the financial instrument.

15. The computer program product of claim 13, wherein the instructions further cause the computer to compare the financial instrument to one or more other financial instruments stored in the digital storage base, wherein the uniqueness rating is determined based further upon results of the comparison.

16. The computer program product of claim 13, wherein the financial instrument contains text that is not handwritten.

17. The computer program product of claim 13, wherein determining that the financial instrument is sufficiently unique comprises:
concluding, after the updating the uniqueness rating, that the uniqueness rating is above the threshold.

* * * * *